(12) United States Patent
Morita

(10) Patent No.: US 6,331,896 B1
(45) Date of Patent: Dec. 18, 2001

(54) PRINTING SYSTEM AND METHOD FOR AVOIDING UNNECESSARILY REPETITIVE OPERATIONS WHILE PREPARING PRINT DATA

(75) Inventor: Tetsuya Morita, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/102,555

(22) Filed: Jun. 23, 1998

(30) Foreign Application Priority Data

Jul. 10, 1997 (JP) .................................................. 9-202295

(51) Int. Cl.⁷ .............................. B41B 15/00; G06F 15/00
(52) U.S. Cl. ....................... 358/1.18; 358/1.19; 358/1.15; 358/1.13; 358/1.1; 358/1.9
(58) Field of Search ........................... 358/1.1, 1.9, 1.13, 358/1.15, 1.18, 1.19, 1.2, 1.3, 1.6, 1.7

(56) References Cited

U.S. PATENT DOCUMENTS 5,732,198 * 3/1998 Deppa et al. ......................... 358/1.2

* cited by examiner

Primary Examiner—Edward Coles
Assistant Examiner—Twyler Lamb
(74) Attorney, Agent, or Firm—Oblon, Spivak, McClelland, Maier & Neustadt, P.C.

(57) ABSTRACT

A printing system including a client terminal and a separate printer connected to the client terminal via signal cables. The client terminal includes a print conditions transfer mechanism which transfers print conditions entered by an operator and a document component generating mechanism. The document component generating mechanism divides a document entered by the operator into a document block, converts data in each document block into printable data, and generates document component. A number of the document component is equal to the number of the divided document blocks so that the document components and the divided document block correspond to each other on a one to one basis. The printer includes a print conditions storing mechanism which receives and stores the print conditions, a document component storing mechanism which sequentially stores and transmits the transferred document component, and a composite print processing mechanism. The composite print processing mechanism generates image data according to the print conditions and corresponding to each of the document components and accumulates the generated image data to print the document with the accumulated image data upon receiving a print start instruction.

15 Claims, 10 Drawing Sheets

FIG. 6

```
1.  DOCUMENT HEADER: DOCUMENT NAME = "FOO.DOC"
2.                   AUTHOR NAME = "THOMAS"
3.                   FILE STATUS = EDITING
4.                   FILE SIZE = 12176
5.                   TOTAL COMPONENT = 436
6.                   TOTAL PAGE = 12
7.                   ORIGINATED DATE & TIME = "1997.1.1 14:05:12"
8.                   LAST MODIFIED DATE & TIME = "1997.3.3 10:07:23"
9.  OPERATION:       {
10.                  DELETED(113), DELETED(114), NEW(145)
11.                  }
12. COMPONENT:       COMPONENT SERIAL NO = 145
13.                  COMPONENT STATUS = NEW
14.                  ORIGINATED DATE & TIME = "1997.3.3 09:51:30"
15.                  LAST MODIFIED DATE & TIME = "1997.3.3 09:51:30"
16.                  PAGE NO = 3
17.                  {
18.                  LINE(18,1), CIRCLE(300, 400, 50),
19.                  LINE(10,3), RECTANGLE(250,450,)-(250,550)-
                     (350,550)-(350,450),
20.                  }
21. COMPONENT:       COMPONENT SERIAL NO =113
22.                  COMPONENT STATUS = DELETED
23.                  ORIGINATED DATA & TIME = "1997.1.1 11:23:15"
24.                  LAST MODIFIED DATE & TIME = "1997.1.1 11:23:15"
25.                  PAGE NO =3
26.                  {
27.                  LINE(36,1), CIRCLE(300,400,85)
28.                  }
29. COMPONENT        COMPONENT SERIAL NO = 114
30.                  COMPONENT STATUS = DELETED
31.                  ORIGINATED DATA & TIME = "1997.1.1 11:26:35"
32.                  LAST MODIFIED DATA & TIME = "1997.1.1 11:26:35"
33.                  PAGE NO = 3
34.                  {
35.                  LINE(20,1), RECTANGLE(100,200)-(100,500)-
                     (300,500)-(300,200),
36.                  }
37.
```

FIG. 7
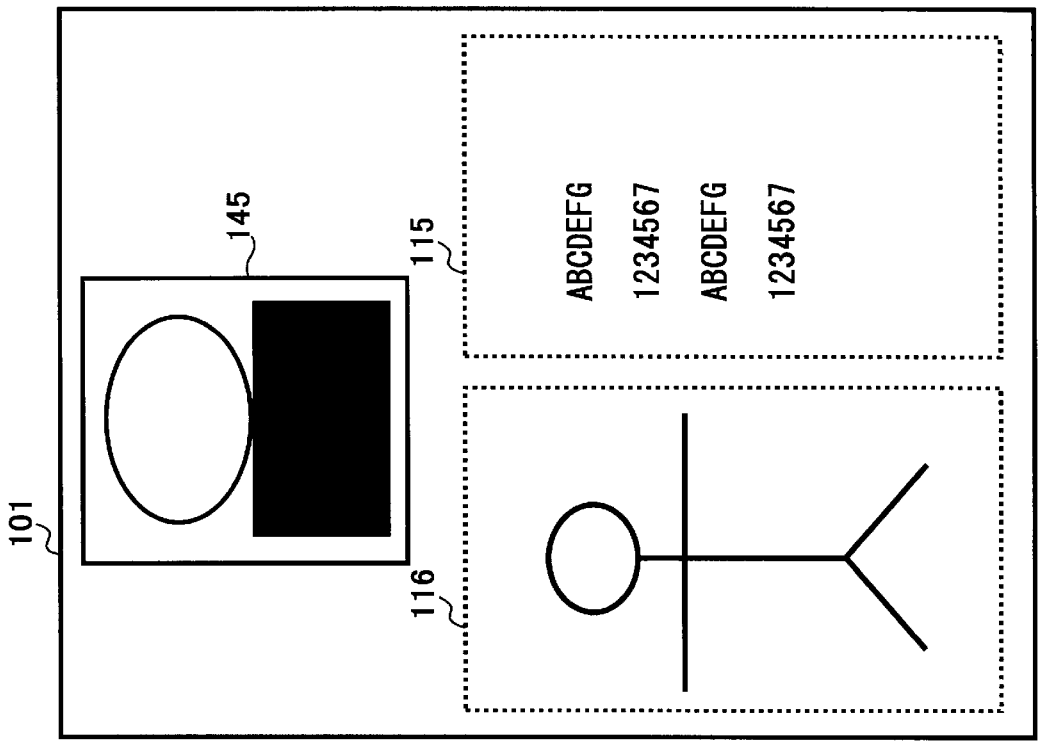
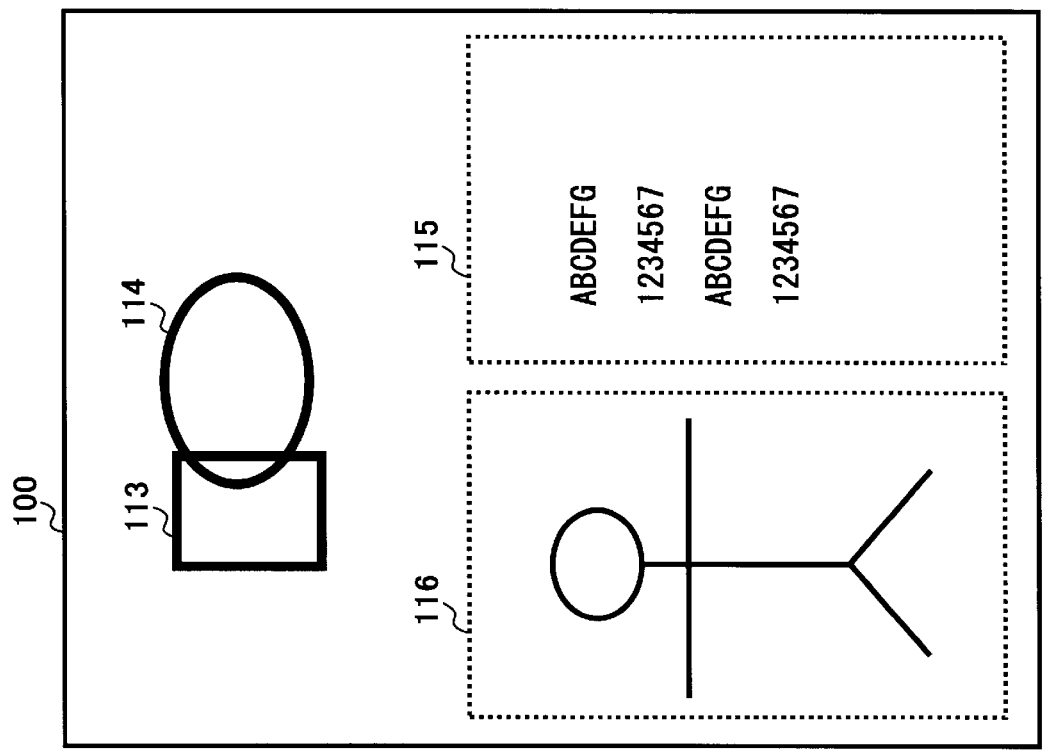

FIG. 9

| | 16 |
|---|---|
| USER NAME | THOMAS |
| PRINTER NAME | LBP001 |
| PAGER SIZE | A4 |
| FINISHING METHOD | SORT & STAPLING |
| SIMPLEX/DUPLEX | SIMPLEX |
| NUMBER OF COPIES | 1 |
| .... | .... |

FIG. 10

| | | |
|---|---|---|
| 1. | CACHE HEADER: | PRINTER NAME = "LB001" |
| 2. | | CACHE STATUS = RUNNING |
| 3. | | CACHE TOTAL DOCUMENT = 3 |
| 4. | | CACHE TOTAL PAGE = 24 |
| 5. | | CACHE TOTAL COMPONENT = 1026 |
| 6. | | CACHE TOTAL SIZE = 53290 |
| 7. | | { |
| 8. | | "FOO1.DOC", { 1,2,100,102,103,115,116,117, ...} |
| 9. | OPERATION: | "FOO2.DOC", { 11,12,34,35,36,89,90,92, ...} |
| 10. | | "FOO3.DOC", { 556,557,990,991,992,1023,1024, 1025,1026} |
| 11. | | } |
| 12. | DOCUMENT HEADER: | DOCUMENT NAME = "FOO1.DOC" |
| 13. | | AUTHOR NAME = "THOMAS" |
| 14. | | FILE STATUS = EDITING |
| 15. | | FILE TOTAL PAGE = 12 |
| 16. | | FILE TOTAL COMPONENT = 436 |
| 17. | | FILE TOTAL SIZE = 12176 |
| 18. | | ORIGINATED DATE & TIME ="1997.1.1 14:05:12" |
| 19. | | LAST MODIFIED DATE & TIME = "1997.3.3 10:07:23" |
| 20. | COMPONENT: | COMPONENT SERIAL NO = 1 |
| 21. | | COMPONENT STATUS = RASTERIZED |
| 22. | | ORIGINATED DATA & TIME = "1997.3.3 09:51:30" |
| 23. | | LAST MODIFIED DATE & TIME = "1997.3.3 09:51:30" |
| 24. | | PAGE NO =7 |
| 25. | | { |
| 26. | | LINE(18,1), CIRCLE(300,400,50) |
| 27. | | LINE(10,3), RECTANGLE(250,450)-(250,550)-(350,550)-(350,450), |
| 28. | | } |
| 29. | COMPONENT | COMPONENT SERIAL NO = 2 |
| 30. | | COMPONENT STATUS = RASTERIZED |
| 31. | | ..... |
| 32. | COMPONENT: | COMPONENT SERIAL NO = 100 |
| 33. | | COMPONENT STATUS = DELETED |
| 34. | | ORIGINATED DATA & TIME = "1997.1.1 11:23:15" |
| 35. | | LAST MODIFIED DATA & TIME = "1997.1.1 11:23:15" |
| 36. | | PAGE NO = 5 |
| 37. | | { |
| 38. | | LINE(36,1), CIRCLE(300,400,85) |
| 39. | | } |
| 40. | COMPONENT: | COMPONENT SERIAL NO = 102 |
| 41. | | COMPONENT STATUS = RASTERIZING |
| 42. | | ORIGINATED DATE & TIME = "1997.1.1 11:26:35" |
| 43. | | LAST MODIFIED DATE & TIME = "1997.1.1 11:26:35" |
| 44. | | PAGE NO = 9 |
| 45. | | { |
| 46. | | LINE(20,1), RECTANGLE(100,200)-(100,500)-(300,500)-(300,200), |
| 47. | | } |
| 48. | | |

PRINTING SYSTEM AND METHOD FOR AVOIDING UNNECESSARILY REPETITIVE OPERATIONS WHILE PREPARING PRINT DATA

BACKGROUND OF THE INVENTION

1. Field of the Invention

The present invention relates to a system and a method for document printing. More particularly, the present invention relates to a system and a method for preparing print data in an efficient manner in which separate client and printing terminals are connected each other and unnecessarily repetitive operations are avoided during a print data preparation time.

2. Discussion of the Background

A conventional printing system includes a client terminal for creating and editing a document and a separate printer for printing a document transmitted from the client terminal. The separate printer is connected to the client terminal with a cable. When completing a document on the client terminal, the operator generally (1) inputs desired print conditions to print data generation software (e.g., a printer driver) in order to have the document converted into data written in a selected page description language; (2) sends the converted data to the printer; and (3) starts the printer to print the data.

However, the above-described procedure has several drawbacks. Even when changing only a small part of the document, the whole document must be processed through the printer driver and then transferred to the printer. The processing and transferring requires a large amount of time relative to the amount of change. In addition, the fact that the desired print conditions can only be designated after the document data is completed makes it difficult, if not impossible, for the printer driver to perform data generation subsequent to creation and change of the document.

Several related techniques are disclosed in Japanese Unexamined Patent Publications JPAP6-243 133, JAPA6-28126, and JPAP8-230249.

The printing system disclosed in JPAP6-28126 is capable of selecting pages that include changes and transmitting only the pages that include changes to the printer. However, when the whole document is printed again, the same procedure is repeated.

A method for parallel performing a printer command using at least two computing devices is disclosed in JPAP6-28126, and a method for performing data conversion with a page description language at the printer side is disclosed in JPAP8-230249. However, neither JPAP6-28126 nor JPAP8-230249 provide a solution to the above-described drawbacks.

SUMMARY OF THE INVENTION

Accordingly, it is an object of the present invention is to provide a novel printing system that includes a client terminal and a separate printing terminal connected to the client terminal, prepares printable image data in an efficient manner, and avoids repetitive operations.

It is yet another object of the present invention to provide a novel method of printing with a printing system that includes a client terminal and a separate printing terminal connected to the client terminal in which printable image data is prepared in an efficient manner and repetitive operations are avoided.

These and other objects are achieved according to a novel printing system and method of printing in which a printing system includes a client terminal and a separate printing terminal connected to the client terminal via signal cables. The client terminal includes a print conditions transfer mechanism which transfers print conditions entered by an operator and a document component generating mechanism. The document component generating mechanism divides a document entered by the operator into a document block, converts data in each document block into printable data, and generates a document component corresponding the document block. The printing terminal includes a print conditions storing mechanism which receives, stores, and transmits the transferred print conditions, a document component storing mechanism which receives, stores, and sequentially transmits the transferred document components, and a composite print processing mechanism which generates image data according to the printed conditions and accumulates the generated image data to print the document with the accumulated image data according to the print conditions upon receiving a print start instruction. The image data corresponds to each of the document components.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is an exemplary list of document components that use the page description language employed in the printers 3 of FIGS. 1, 5, and 8;

FIG. 7 is an illustration of an exemplary document used in the printing system of FIGS. 1 and 5;

FIG. 9 is an exemplary table of the information stored in the memory 16 of FIG. 8; and FIG. 10 is an exemplary list of identification information stored in the document component storing section 23 of FIGS. 1, 5, and 8.

DESCRIPTION OF THE PREFERRED EMBODIMENTS

Figure 1:
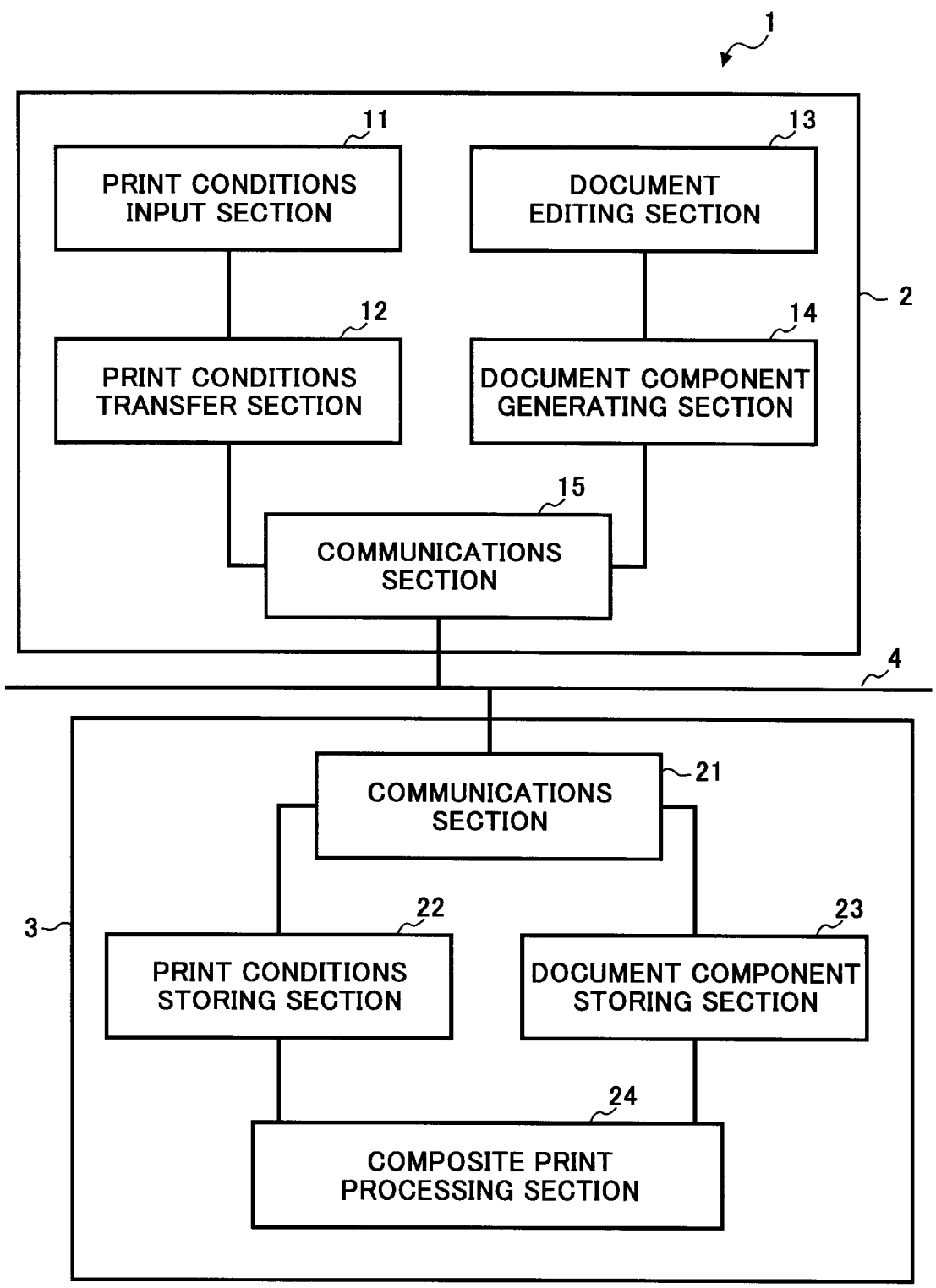
FIG. 1 is a block diagram of a printing system according to a first embodiment of the present invention.

Referring now to the drawings, wherein like reference numerals designate identical or corresponding parts throughout the several views, and more particularly to FIG. 1 thereof, according to a first embodiment of the present invention, a printing system 1 includes a client terminal 2 for creating and editing a document, a printer 3 for printing a document transferred from the client terminal 2, and a communications line 4 for transmitting a document from the client terminal 2 to the printer 3. In addition, the communications line 4 of the printing system 1 may be connected to other equipment and/or network systems, so that the printing system 1 is a part of the whole system.

The client terminal 2 includes a print conditions entry section 11, a print conditions transfer section 12, a document editing section 13, a document component generating section 14, and a communications section 15. The print conditions entry section 11 serves as a data entry mechanism through which users can arbitrarily input data that represent desired print conditions. The desired print conditions may include a designation of a printer, a print paper size, a number of print copies, a double-sided print, a sorting method, a stapling method, and so forth. These print conditions include parameters necessary for a process of generating the print data and for the data processing by the printer 3. The print conditions transfer section 12 transfers the entered print conditions to the printer 3. The document editing section 13 creates and edits a document in accordance with user instructions. The document component generating section 14 creates document components, explained below. The communications section 15 transmits and receives arbitrary data to and from the printer 3.

The printer 3 includes a communications section 21, a print conditions storing section 22, a document component storing section 23, and a composite print processing section 24. The communications section 21 transmits and receives arbitrary data to and from the client terminal 2. The print conditions storing section 22 stores print conditions transmitted from the print conditions transfer section 12 via the communications section 15, the communications line 4, and the communications section 21. The document component storing section 23 stores document components transmitted from the document component generating section 14 via the communications section 15, the communications line 4, and the communications section 21. The composite print processing section 24 receives the print conditions from the print conditions storing section 22, receives the document components from the document component generating section 23, and generates image data based on the document components and the print conditions.

A document component used in the printing system 1 is a predetermined divisible unit of document data. An example of a one page document is conceptually illustrated in FIG. 2. A document 30 is composed of document components 31 through 34 that contain a Japanese text, a table, an image, and an English text, respectively.

Next, the operation of the client terminal 2 is explained with reference to the flowchart of FIG. 3. As described above, users can specify various print conditions (e.g., a designation of a printer, a print paper size, a number of print copies, a double-sided print, a sorting method, a stapling method, and so forth) which include parameters necessary to generate the print data and to process the print data with the printer 3.

Figure 3:
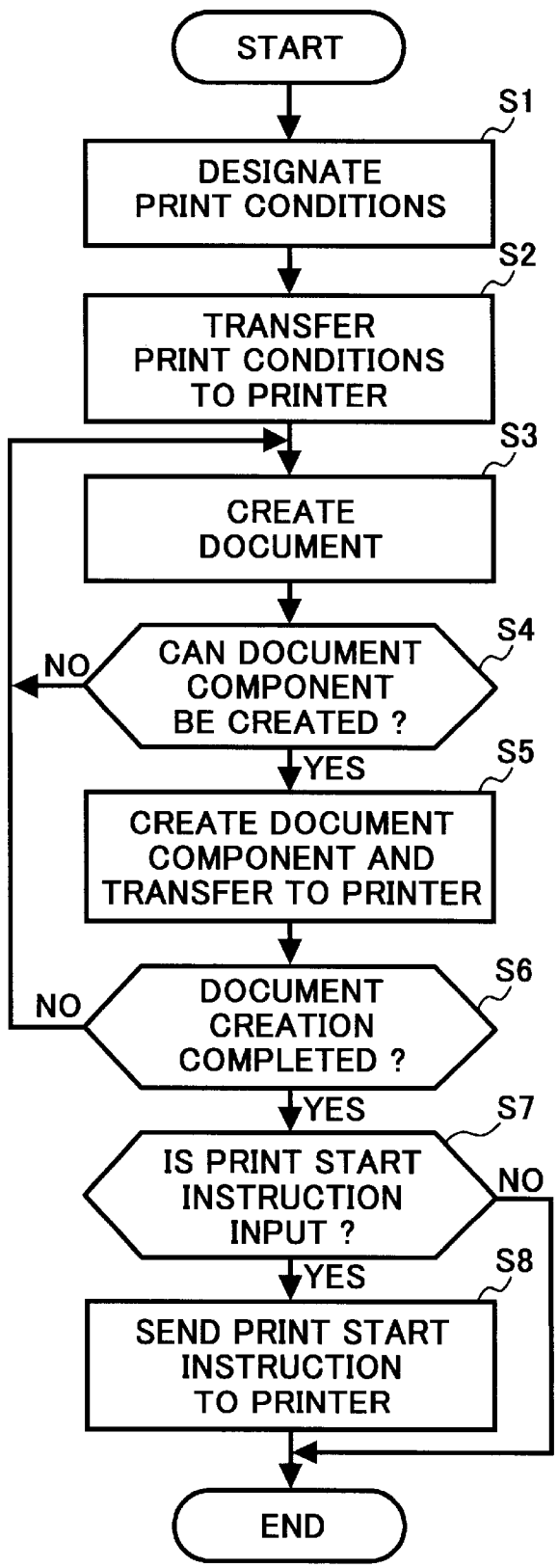
FIG. 3 is a flowchart describing the operation of the client terminal 2 of FIG. 1.

In Step S1 of FIG. 3, an operator designates desired print conditions by inputting the desired print conditions in the print conditions entry section 11. Then in Step S2, the print conditions transfer section 12 transfers the print conditions to the printer 3. Next in Step S3, the operator creates and edits a document through the document editing section 13. The document which is created and edited in the document editing section 13 is sequentially transferred to the document component generating section 14.

Figure 2:
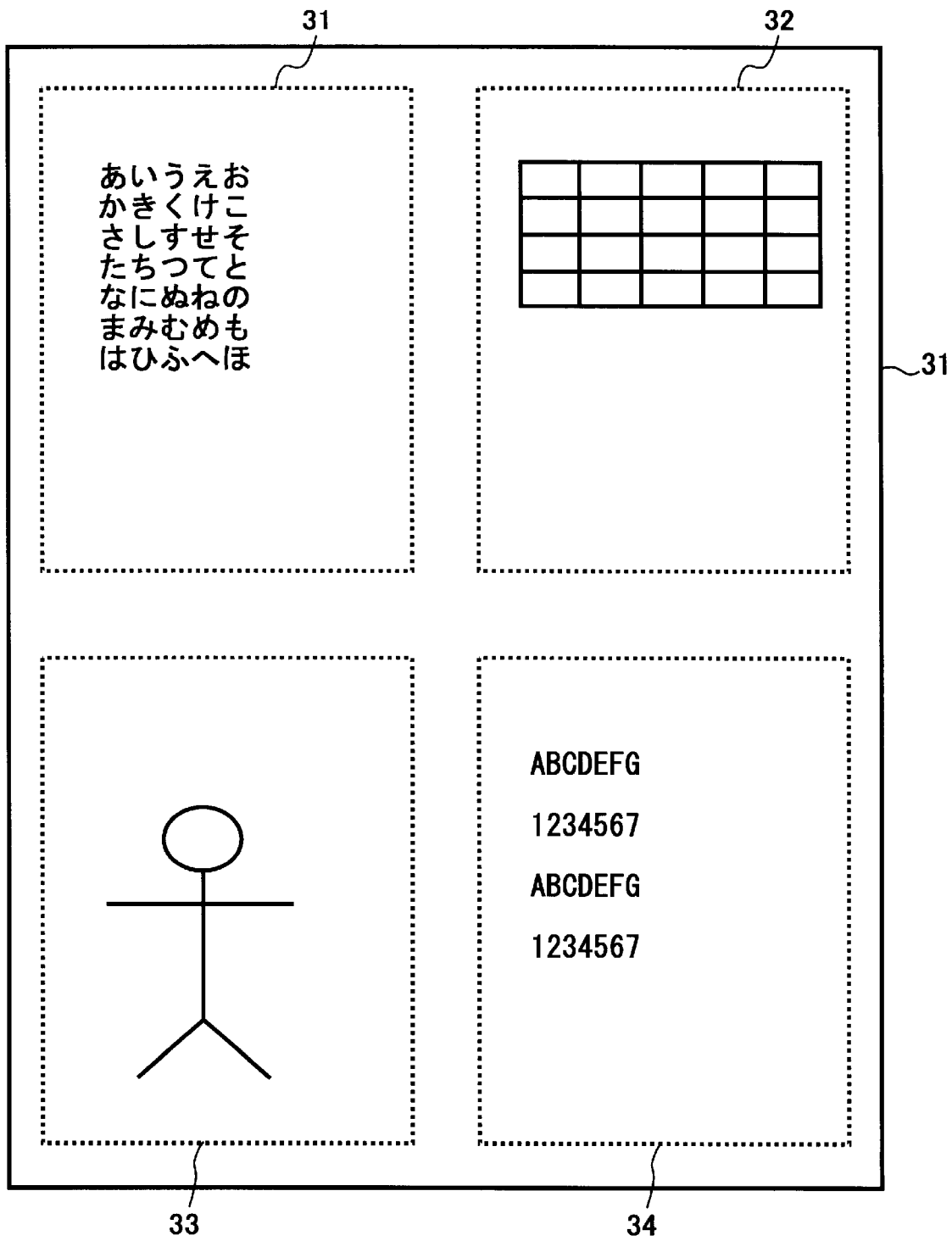
FIG. 2 is an illustration of an exemplary document used in the printing system of FIG. 1.

Then, in Step S4, the document component generating section 14 determines whether the document data transferred from the document component generating section 14 is sufficient to create a document component, such as one of the document components 31 through 34 of FIG. 2, for example. If the document data is insufficient to create a document component, the process returns to Step S3. If the document data is sufficient to create a document component, the process proceeds to Step S5 and the document component generating section 14 creates a document component by converting the document data into data that conforms to a print data format of the printer 3. The printer 3 prints documents in accordance with the input print conditions. Further, in Step S5, the document component generating section 14 transfers the created document component to the printer 3. The standard printer commands or one of various page description languages can be used for the print data format of the printer 3.

Next in Step S6, the completion of creating and editing the document is checked. The process of generating and sending a document component in Steps S3 through S5 is repeated by a NO loop until the process of creating and editing the document is ended. Once the process of creating and editing the document is ended, the process proceeds to Step S7. In Step S7, an input of a print start instruction is checked. When the print start instruction is input (i.e., the check result of Step S7 is YES), the client terminal 2 sends the print start instruction to the printer 3 in Step S8. Then, the process ends. If the print start instruction is not input (i.e, the check result of Step S7 is NO), the process skips Step S8 and ends.

Figure 4:
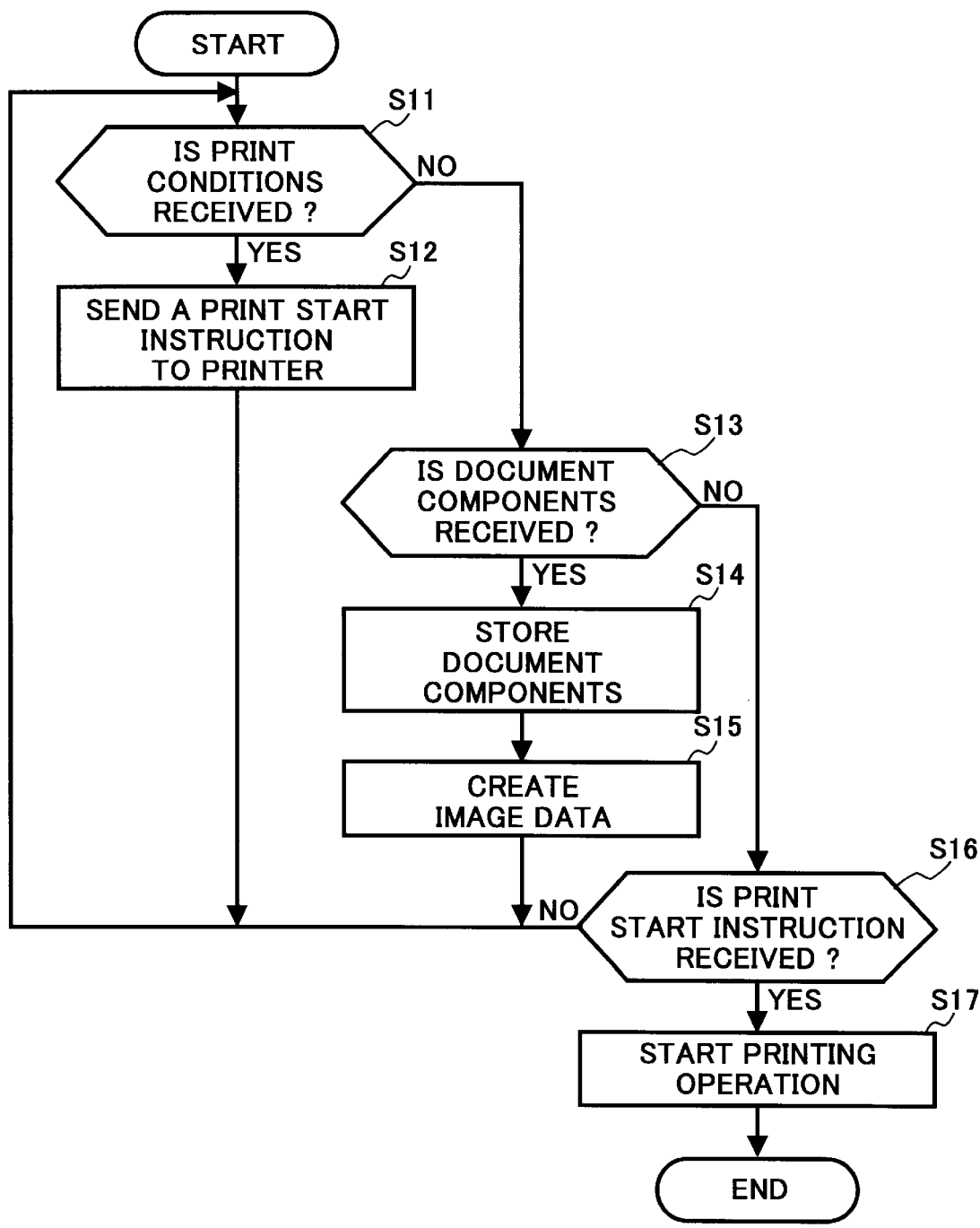
FIG. 4 is a flowchart describing the operation of the printer 3 of FIG. 1.

Next, the operation of the printer 3 is explained with reference to the flowchart of FIG. 4. In Step S11, a check is performed to determine whether the communications section 21 has received the print conditions sent from the client terminal 2. When the communications section 21 receives the print conditions (i.e, the check result of Step S11 is YES), the process proceeds to Step S12, and the print conditions are sent to the print conditions storing section 22 so as to be stored therein. Then, the process returns to Step S11 in order to check for further receipt of the print conditions from the client terminal 2. This cycle continues until the check result of Step S11 becomes NO.

When the check result of Step S11 is NO, the process proceeds to Step S13 and a check is performed to determine whether the communications section 21 receives a document component sent from the client terminal 2. When the communications section 21 receives a document component (i.e., the check result of Step S13 is YES), the process proceeds to Step S14 and the document component is sent to the document component storing section 23 to be stored therein. Then in Step S15, the composite print processing section 24 creates image data based on the print conditions and the document component stored in the print conditions storing section 22 and the document component storing section 23, respectively, and stores the generated image data therein. Then, the process returns to Step S11 in order to check for further receipt of the print conditions from the client terminal 2. This cycle continues until the check result of Step S13 becomes NO. In this manner, an entire document can be accumulated in the form of image data in the composite print processing section 24.

Then, when the check result of Step S13 is NO, the process proceeds to Step S16 and a check is performed to determine whether the communications section 21 receives the print start instruction sent from the client terminal 2. When the communications section 21 receives no print start instruction (i.e., the check result of Step S16 is NO), the process returns to Step S11 to check for the receipt of the print conditions from the client terminal 2. When the communications section 21 receives the print start instruction (i.e., the check result of Step S16 is YES), the process proceeds to Step S17 and the composite print processing section 24 starts to print. Then, the process ends.

Figure 5:
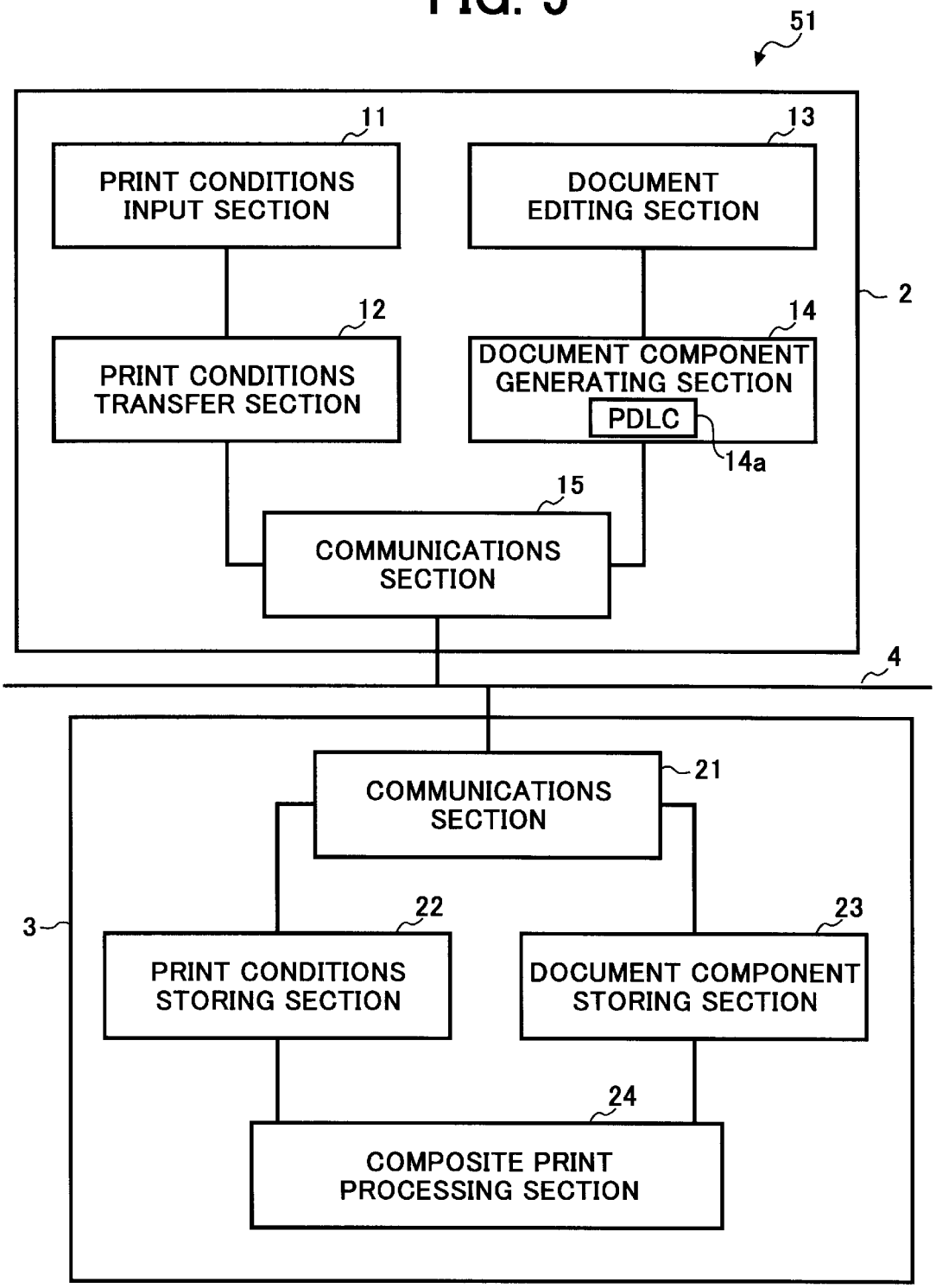
FIG. 5 is a block diagram of a printing system according to a second embodiment of the present invention.

Next, a printing system 51 according to a second exemplary embodiment of the present invention is explained with reference to FIGS. 5 and 6. The printing system 51 of FIG. 5 is similar to the printing system 1 of FIG. 1, except that a page description language converter (PDLC) 14a is arranged in the document component generating section 14 of the client terminal 2 of the printing system 51. In the printing system 51, the PDLC 14a converts the document data into the page description language employed in the printer 3 when the document component generating section 14 generates a document component. Therefore, the generated document component is generated using the page description language employed in the printer 3.

FIG. 6 illustrates an exemplary list of document components using the page description language employed in the printer 3 of FIG. 5. Numbers, n, in the leftmost column in the list of FIG. 6 represent the nth of lines of a page, for the sake of simplicity.

The list of the document components include a portion referred to as a "document header" in lines 1 through 8. The document header contains document data identifying information such as the document name, the document author, the document data status, the document size, the number of document components, the number of pages, the date of generation, the date of modification, and so forth.

The list of the document components of FIG. 6 further include a portion referred to as an "operation" in lines 9 through 11. The operation indicates the history of document editing with various marks. For example, "DELETED (113)" and "DELETED (114)" marks indicate that document components 113 and 114 are deleted, respectively, and a "NEW (145)" mark indicates that a document component 145 is newly generated.

The above-mentioned information is also indicated in a data field for each document component. The list of the document components of FIG. 6 includes three document components in lines, 12 through 20, 21 through 28, and 29 through 37, respectively. Each document component field includes various information such as a document component number, a document component status, the date of generation, the date of modification, the page number, and print data, for example.

In the above-described printing system 51, the generation of document components by the document component 14 may occur at a time designated by the operator, after a predetermined interval of time, at each time of a saving operation for document data, or at a time corresponding to the progress of document editing in pages, for example.

Next, an operation of the printing system when the document is modified is explained with reference to FIG. 7. When a document is modified on the client terminal 2 of the printing system 1 or 51, a document component that includes the modified portion is sent to the printer 3. Then, the document component storing section 23 stores the transferred document component, and the composite print processing section 24 generates image data based on the transferred document component so that a corresponding portion of the image data accumulated therein is changed with the generated image data. Then, upon receiving a print start instruction from the client terminal 2, the printer 3 starts to print the image data including the modified portion.

FIG. 7 shows an original document 100 and a modified document 101 which is a modification of the original document 100. The original document 100 corresponds to the status of the document components listed in FIG. 6 before it is printed. The modified document 101 corresponds to the status of the document components listed in FIG. 6 after it is printed. That is, in the document component of FIG. 6, the components 113 and 114 are deleted and the component 145 is newly generated, as indicated by the respective component statuses. The components 113 and 114 represent a square and an ellipse, respectively, of the original document 100. The component 145 represents a different square and an ellipse of the modified document 101.

In this manner, when an operator modifies a document which has been completed, the client terminal 2 transmits only the modified portion of document component to the printer 3, so that the printing system 1 or 51 can reduce the transmission time for transmitting the document to the printer 3.

Figure 8:
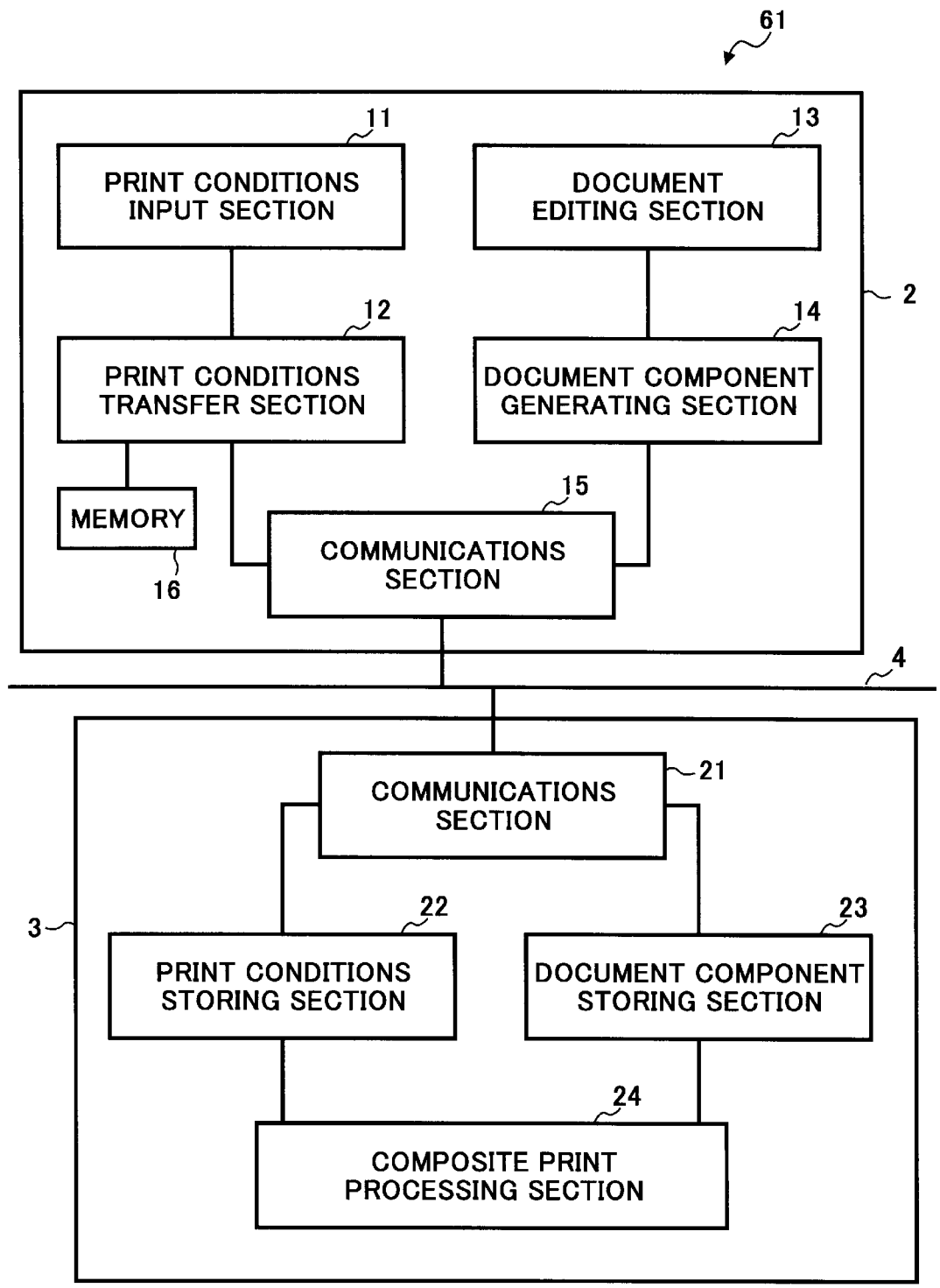
FIG. 8 is a block diagram of a printing system according to a third embodiment of the present invention.

Next, a printing system 61 according to a third embodiment of the present invention is explained with reference to FIGS. 8 and 9. The printing system 61 of FIG. 8 is similar to the printing system 1 of FIG. 1, except that a memory 16 is connected to the print conditions transfer section 12 of the client terminal 2 of the printing system 61.

As shown in FIG. 9, the memory 16 stores various information including a user name, a default printer name for each user, various default print conditions for each user (including a paper size), a finishing method (such as a sort and a stapling), a selection of simplex and duplex, a number of copies, and so forth, for example. In the printing system 61, an operator first designates the user name to designate the default printer and/or print conditions. After the document creating and/or editing process, the document components are transferred to the printer 3 and printed by the printer 3. In this manner, the time it takes for an operator to designate a printer to print the document is reduced, and the time it takes to account for the various print conditions required by each designated printer is reduced.

Next, another operation of the printing system 1, 51, or 61 is explained with reference to FIG. 10. The document component storing sections 23 of the printer 3 of the printing systems 1, 51, and 61 are configured to store the document component even after the printer 3 completes the printing operation. The document component generating section 14 of the client terminal 2 is configured to search the contents of the document component storing section 23. By searching the contents of the document component storing section 23, the client terminal 2 can obtain identification information for the document component and the original document from the document component storing section 23—even after the document is printed by the printer 3.

An exemplary list of the identification information stored in the document component storing section 23 is shown in FIG. 10. The identification information includes a cash header in lines 1 through 11 (including various identification information such as the total number of documents, pages, and components), a total data size, and a short list of document names, and corresponding component numbers for each document name.

Using the above-described identification information, the client terminal 2 can avoid transmission of the document components when they are already stored in the document component storing section 23.

Next, a still further operation of the printing system 1, 51, and 61 is explained with reference to FIGS. 6 and 10. A document component of the document component storing section 23 is arranged to have various status information including a new generation flag for indicating that the document component is newly generated, an under-rasterization flag for indicating that the document is under conversion from a document component into image data for printing, a rasterization-completed flag for indicating that the document component has been rasterized, a syntax error for indicating that a document component has a syntax error, a process error for indicating that a document component has caused an error during the rasterization process, and a deleted flag for indicating that the document component is deleted. The client terminal 2 can obtain the status information as the identification information for the document component and its original document from the document component storing section 23—even after the document is printed by the printer 3.

For example, when a document component is newly created, the new generation flag pertinent to the corresponding document component is indicated as "NEW" as shown at line 13 of FIG. 6. As another example, when a document component is under rasterization, the under-rasterization flag of the corresponding document component is indicated as "RASTERIZING" as shown at line 21, for example, of FIG. 10. As yet another example, when a document component is deleted, the delete flag of the corresponding document component is indicated as "DELETED," as shown at line 33 of FIG. 10. In a similar manner, the rasterization-completed flag, the syntax error, and the process error will be indicated as "RASTERIZED" (not shown), "SYNTAX ERROR" (not shown), and "PROCESSING ERROR" (not shown), respectively. As for a document component indicated as "DELETED," such a deleted document component may be brought back using an undo function so that the deleted document component may be used again.

In this manner, the client terminal 2 can refer to the identification information to determine whether the document component storing section 23 is storing the same document that the client terminal 2 is going to print. If the client terminal 2 determines that the document component storing section 23 is storing the same document that the client terminal is going to print, the client terminal 2 can avoid transmission of the document. Thus, only the print start instruction has to be transmitted from the client terminal.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention may be possible in light of the above teachings. It is therefore to be understood that within the scope of the appended claims, the present invention may be practiced otherwise than as specifically described herein.

This application is based on Japanese patent application No. JPAP09-202295, filed in the Japanese Patent Office on Jul. 10, 1997, the entire contents of which are hereby incorporated by reference.

What is claimed is:

1. A printing system, comprising:
   a client terminal that comprises
      a print conditions transfer mechanism configured to transport print conditions entered by an operator, and
      a document component generating mechanism configured to divide a document entered by the operator into document blocks corresponding to different portions of the document, convert data in said document blocks into printable data, generate document components corresponding respectively to said document blocks, and transfer said document components; and
   a printing terminal that comprises
      a print conditions storing mechanism configured to receive and store said print conditions transferred from the print conditions transfer mechanism,
      a document component storing mechanism configured to receive said document components transferred from the document component generating mechanism and sequentially store and transmit said document components, and
      a composite print processing mechanism configured to receive said print conditions from said print conditions storing mechanism and said document components sequentially transmitted from said document component storing mechanism, generate image data according to said print conditions and corresponding to said document components, accumulate said generated image data, and print said document with the accumulated image data upon receiving a print start instruction,
   wherein said document component generating mechanism is configured to modify, in response to a change to a part of said document, the contents of a corresponding document component from among said plurality of document components in accordance with the change and transfer the modified document component to said composite print processing mechanism via said document component storing mechanism, and
   said composite print processing mechanism is configured to generate, upon receiving said modified document component, modified image data from said modified document component, replace with said modified image data a corresponding portion of the accumulated image data, and initiate printing of said document with said accumulated image data including the modified image data upon receiving a print start instruction.

2. The printing system according to claim 1, wherein said document component generating mechanism comprises:
   a page description language converter configured to convert said data in each document block into a page description language to convert data in each document block into printable data that can be printed by said printing terminal.

3. The printing system according to claim 1, wherein said client terminal further comprises:
   a print conditions storing memory configured to store an information table including a designated printing terminal and selected print conditions for each of a plurality of registered users.

4. The printing system according to claim 1, wherein said document component storing mechanism is configured to store the document component after the corresponding image data is printed, and said document component generating mechanism is configured to search the contents of said document component storing mechanism.

5. The printing system according to claim 1, wherein said document component comprises:

information representing at least one of a plurality of document processing statuses, said document processing statuses including a plurality of flags that indicate if the document is newly generated, under-rasterization, rasterization-completed, under syntax errors, under a rasterization processing error, or deleted.

6. A print system, comprising:

a client terminal that comprises print conditions transfer means for transferring print conditions entered by an operator, and document component generating means for dividing a document entered by the operator into document blocks corresponding to different portions of the document, converting data in said document blocks into printable data, generating document components corresponding respectively to said document blocks, and transferring said document components; and a printing terminal that comprises print conditions storing means for receiving and storing said print conditions transferred from the print conditions transfer means, document component storing means for receiving said document components transferred from the document component generating means and sequentially storing and transmitting said document components, and composite print processing means for receiving said print conditions from said print conditions storing means and said document components sequentially sent from said document component storing means, generating image data according to said print conditions and corresponding to said document components, accumulating said generated image data, and printing said document with the accumulated image data upon receiving a print start instruction, wherein said document component generating means comprises means for modifying, in response to a change to a part of said document, a corresponding document component from among said plurality of document components in accordance with the change and transferring the modified document component to said composite print processing means via said document component storing means, and said composite print processing means comprises means for generating, upon receiving said modified document component, modified image data from said modified document component, replacing with said modified image data a corresponding portion of the accumulated image data, and initiating printing of said document with said accumulated image data including the modified image data upon receiving a print start instruction.

7. The printing system according to claim 6, wherein said document component generating means comprises:

page description converter means for converting said data in each document block into page description language to convert said data in each document block into printable data that can be printed by said printing terminal.

8. The printing system according to claim 6, wherein said client terminal further comprises:

a print conditions storing memory that stores an information table including a designated printing terminal and selected print conditions for each of a plurality of registered users.

9. The printing system according to claim 6, wherein said document component storing means comprises means for storing the document components after the corresponding image data is printed, and said document component generating means comprises means for searching the contents of said document component storing means.

10. The printing system according to claim 6, wherein said document component comprises:

information representing at least one of a plurality of document processing statuses, said document processing statuses including a plurality of flags that indicate if the document is newly generated, under-rasterization, rasterization completed, under syntax errors, under a rasterization processing error, or deleted.

11. A method for printing, comprising the steps of:

providing a client terminal and a printing terminal;

sending print conditions entered by an operator at the client terminal to the printing terminal;

storing in said printing terminal said transferred print conditions;

dividing a document entered by the operator at the client terminal into document blocks corresponding to different portions of the document;

converting data in said document blocks into printable data;

generating document components corresponding respectively to said document blocks;

transferring said document components from said client terminal to said printing terminal;

sequentially receiving and storing in said printing terminal the transferred document components;

generating image data according to said stored print conditions and corresponding to said document components;

accumulating said generated image data; and printing said document with said accumulated image data upon receiving a print start instruction from the client terminal, wherein said generating step comprises modifying, in response to a change to a part of said document, the contents of a corresponding document component from among said plurality of document components in accordance with the change, said step of transferring the document comprises transferring the modified document from the client terminal to the print terminal, said step of receiving and storing comprises receiving and storing said modified document component in the print terminal, and said step of generating the image data comprises generating, upon receiving said modified document component, modified image data from said modified document component, replacing with said modified image data a corresponding portion of the accumulated image data, and initiating printing of said document with the accumulated image data including the modified image data upon receiving a print start instruction.

12. The method according to claim 11, wherein said converting step comprises:

converting said data in each document block into a page description language to convert said data in each document block into printable data that can be printed in said printing step.

13. The method according to claim 11, wherein said method further comprises:

storing an information table including a designated printing terminal and selected print conditions for each of a plurality of registered users.

14. The method according to claim 11, wherein said second receiving and storing step comprises storing the document components in a memory after the corresponding image data is printed, and said generating step comprises searching the contents of the memory.

15. The method according to claim 11, wherein said generating step comprises:

generating for said document component, information representing at least one of a plurality of document processing statuses, said document processing statuses including a plurality of flags that indicate if the document is newly generated, under-rasterization, rasterization-completed, under syntax errors, under a rasterization processing error, or deleted.

* * * * *